(12) United States Patent
Kai

(10) Patent No.: US 7,198,286 B2
(45) Date of Patent: Apr. 3, 2007

(54) AIRBAG DEVICE

(75) Inventor: Takeshi Kai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 10/964,050

(22) Filed: Oct. 12, 2004

(65) Prior Publication Data

US 2005/0110248 A1     May 26, 2005

(30) Foreign Application Priority Data

Oct. 17, 2003   (JP)   ............................. 2003-357332

(51) Int. Cl.
*B60R 21/16*     (2006.01)
*B60R 21/203*    (2006.01)
*B60R 21/233*    (2006.01)

(52) U.S. Cl. .................... 280/729; 280/731; 280/743.1

(58) Field of Classification Search ................ 280/729, 280/731, 743.1; *B60R 21/16, 21/203, 21/233*
See application file for complete search history.

(56) References Cited

U.S. PATENT DOCUMENTS

| | | | | |
|---|---|---|---|---|
| 2,974,912 A | * | 3/1961 | Namsick | 244/138 R |
| 3,675,942 A | * | 7/1972 | Huber | 280/738 |
| 3,715,130 A | * | 2/1973 | Harada et al. | 280/738 |
| 3,843,150 A | * | 10/1974 | Harada et al. | 280/729 |
| 4,076,277 A | * | 2/1978 | Kuwakado et al. | 280/738 |
| 4,875,548 A | * | 10/1989 | Lorsbach | 182/137 |
| 5,249,824 A | * | 10/1993 | Swann et al. | 280/729 |
| 5,542,695 A | * | 8/1996 | Hanson | 280/729 |
| 6,260,877 B1 | * | 7/2001 | Rasmussen, Sr. | 280/729 |

FOREIGN PATENT DOCUMENTS

JP        7-25303        1/1995

* cited by examiner

*Primary Examiner*—Paul N. Dickson
*Assistant Examiner*—Joselynn Y. Sliteris
(74) *Attorney, Agent, or Firm*—Hamre, Schumann, Mueller & Larson, P.C.

(57) ABSTRACT

An airbag device capable of quickly deploying an airbag with a compact inflator, and easy to manufacture.

5 Claims, 6 Drawing Sheets

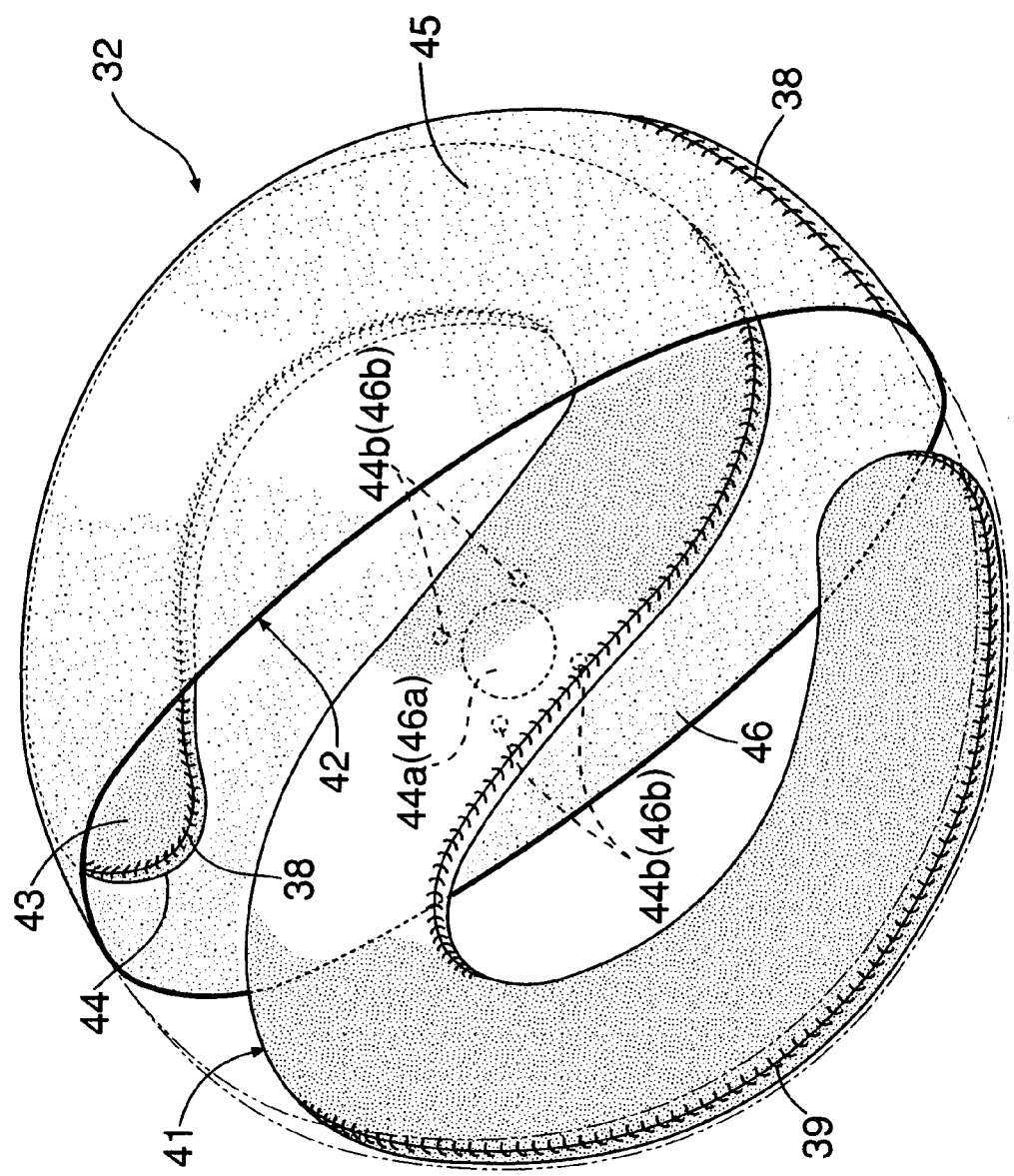

AIRBAG DEVICE

FIELD OF THE INVENTION

The present invention relates to an airbag device for deploying an airbag into a vehicle compartment by inflating the airbag with a gas generated by an inflator at a time of collision of a vehicle.

BACKGROUND OF THE INVENTION

Japanese Patent Application Laid-open No. 7-25303 discloses an airbag device in which an inner bag having four branch parts branching from a collecting part connected to an inflator is integrally sewn onto an inner surface of a bag body having an air supply/discharge hole, and a gas is supplied to the branch parts of the inner bag to inflate the inner bag, thereby giving tension to the bag body to take in the external air through the air supply/discharge hole to inflate the bag body. According to this airbag device, it is possible to inflate the bag body by only inflating the inner bag by supplying the gas, and therefore the inflator can be made compact.

However, in the above-described conventional airbag device, the base cloth of the inner bag which is inflated by inflow of the gas is sewn integrally onto the base cloth of the bag body to form a closed space, resulting in a problem that the manufacturing process is complicated to increase the cost, as compared with the case where the inner bag and the bag body are individually sewn.

The present invention has been achieved in view of the above-mentioned circumstances, and its object is to provide an airbag device capable of quickly deploying an airbag with a compact inflator and easy to manufacture.

SUMMARY OF THE INVENTION

In order to achieve the above-described object, an airbag device for deploying an airbag into a vehicle compartment by inflating the airbag with a gas generated by an inflator at a time of collision of a vehicle, wherein the airbag is constructed by an inner airbag and an outer airbag which are independent from each other, and the inner airbag is inflated by supplying the gas into the inner airbag, whereby inflation of the inner airbag inflates the outer airbag to have a volume larger than that of the inner airbag.

Therefore, it is possible to reduce the amount of the gas required for inflating the outer airbag to have a predetermined volume, and to quickly deploy the airbag while making the inflator compact. In addition, the inner airbag and the outer airbag are independent from each other, thus simplifying sewing to facilitate the manufacture.

Further, the inner airbag is inflated into an S-shape so as to be along an inner periphery of the outer airbag. Therefore, the entire airbag can be deployed into a suitable shape while giving tension to the central portion of the outer airbag through the inner airbag.

BRIEF DESCRIPTION OF THE DRAWINGS

FIG. 5 is a perspective view of the airbag in the deployed state.

DETAILED DESCRIPTION OF THE INVENTION

A mode of carrying out the present invention will be explained based on an embodiment of the present invention shown in the attached drawings.

Figure 1:
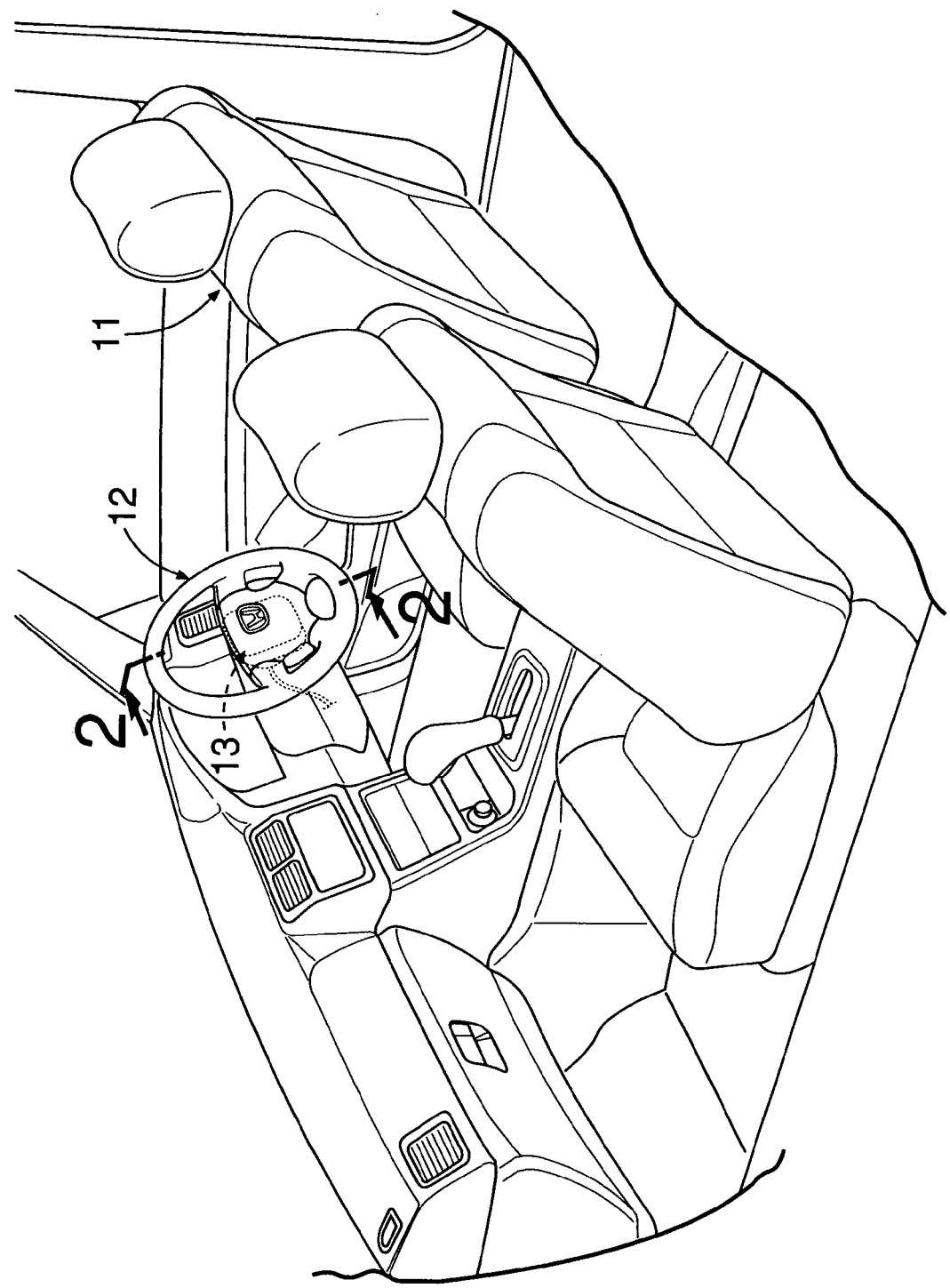
FIG. 1 is a perspective view of a front part of a vehicle compartment of an automobile.

As shown in FIG. 1, an airbag module 13 for a driver's seat is housed inside a steering wheel 12 disposed in front of the driver seat 11.

Figure 2:
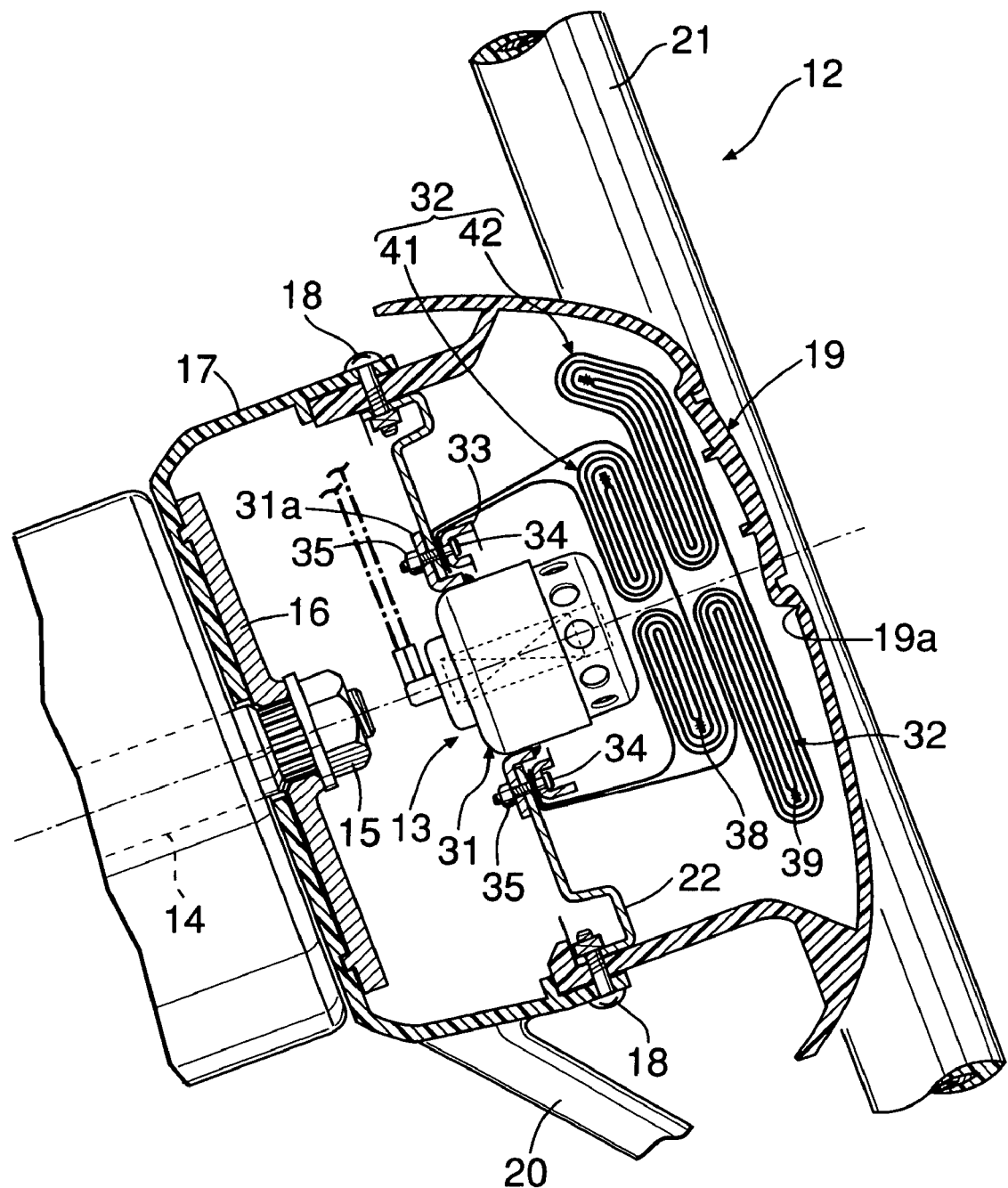
FIG. 2 is an enlarged sectional view taken along the line 2—2 in FIG. 1.

As shown in FIG. 2, the steering wheel 12 includes a boss portion 16 fixed to a rear end of a steering shaft 14 with a nut 15, a front cover 17 fixed to the boss portion 16, a rear cover 19 fixed to a rear surface of the front cover 17 with bolts 18, a plurality of spoke portions 20 which radially extend from the front cover 17, and a steering wheel body portion 21 which connects to outer peripheries of the spoke portions 20. A retainer 22 is fastened together to an inner peripheral surface of the rear cover 19 with bolts 18, and an airbag module 13 is supported by the retainer 22. A thin tear line 19a which is broken when the airbag 32 inflates is formed in an inner surface of the rear cover 19.

The airbag module 13 includes an inflator 31 charged with a propellant which generates a high pressure gas by combustion, and an airbag 32 constructed by sewing a base cloth, and a fixing ring 33 for fixing a base portion of the airbag 32. A flange 31a of the inflator 31 and the fixing ring 33 are overlaid on a front surface and a rear surface of the retainer 22, and fastened with bolts 34 and nuts 35. At this time, the base portion of the airbag 32 is sandwiched and fixed between the rear surface of the retainer 22 and a front surface of the fixing ring 33.

Figure 3:
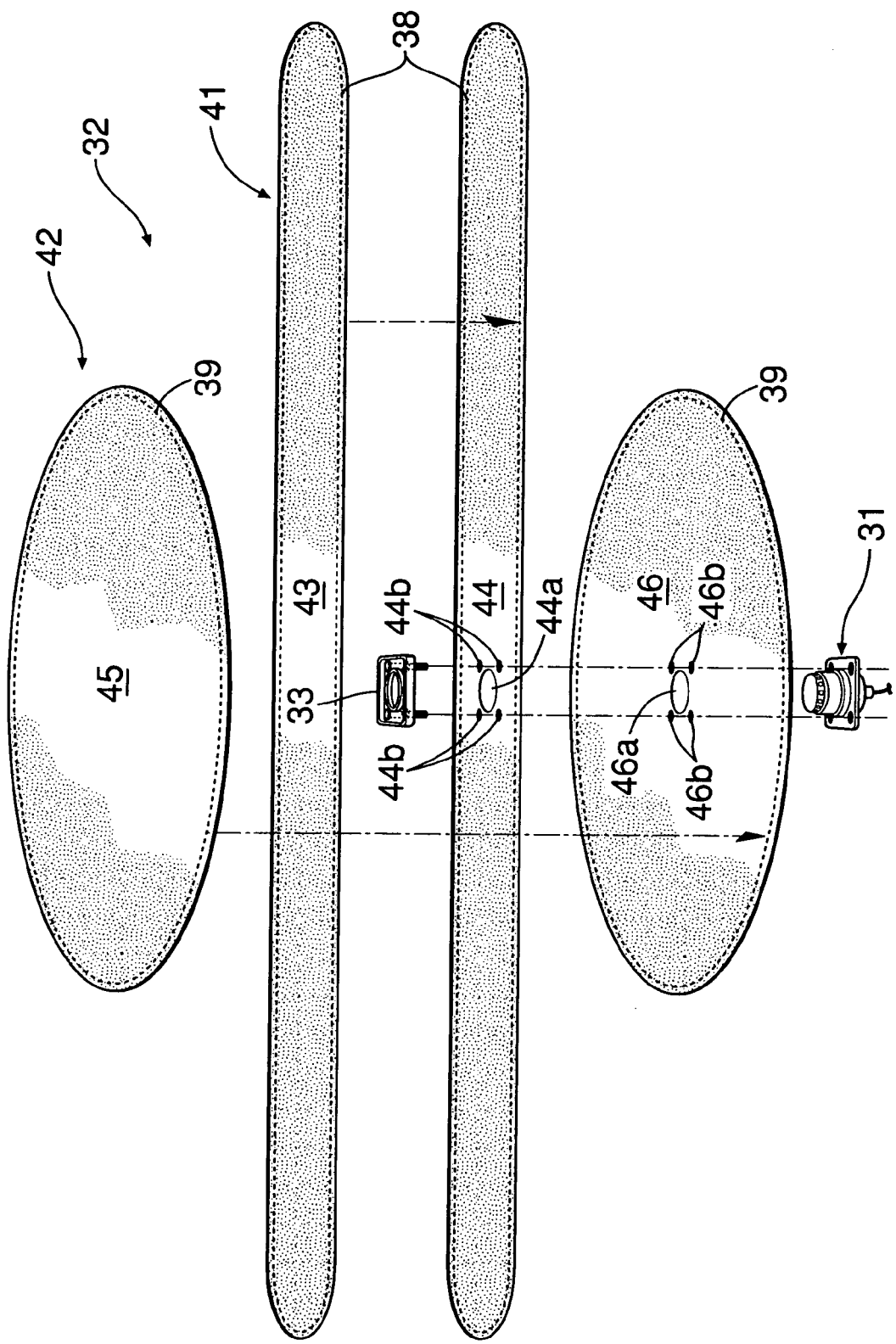
FIG. 3 is an exploded perspective view of an airbag.

As shown in FIG. 3, the airbag 32 forming a generally circular shape is constructed by an inner airbag 41 and an outer airbag 42. The inner airbag 41 includes a band-shaped first base cloth 43 located at a rear side (side opposed to an occupant), and a second base cloth 44 in the same shape which is overlaid on a front surface of the first base cloth 43. The first and the second base cloths 43 and 44 are integrally sewn on sewing portions 38 on their outer perimeters. The outer airbag 42 includes a circular third base cloth 45 at the rear side (side opposed to the occupant), and a fourth base cloth 46 in the same shape which is overlaid on a front surface of the third base cloth 45. The third and the fourth base cloths 45 and 46 are integrally sewn on sewing portions 39 on their outer perimeters.

A circular opening 44a surrounding the inflator 31, and four bolt holes 44b through which the bolts 34 penetrate are formed in the second base cloth 44 of the inner airbag 41. A circular opening 46a surrounding the inflator 31, and four bolt holes 46b through which the bolts 34 penetrate are formed in the fourth base cloth 46 of the outer airbag 42. Accordingly, the airbag 32 is supported by the retainer 22 in central portions of the second and the fourth base cloths 44 and 46, and the gas generated by the inflator 31 is supplied into the inner airbag 41 through the openings 44a and 46a in the centers of the second and the fourth base cloths 44 and 46.

The inner airbag 41 assumes a straight cylindrical shape with a circular section when the inner airbag 41 inflates in a free state without hindrance, but when the inner airbag 41 inflates inside the outer airbag 42, the inner airbag 41 is restrained by the outer peripheral surface of the circular outer airbag 42 to be curved into an S-shape.

When the acceleration of a predetermined value or more is detected at the time of collision of the vehicle, the inflator 31 is ignited, and the folded airbag 32 starts inflating with the gas generated by the inflator 31. In the rear cover 19 receiving the pressure of the inflating airbag 32, the tear line 19a is broken, and from the thus-formed opening, the airbag 32 deploys into the vehicle compartment.

Figure 4:
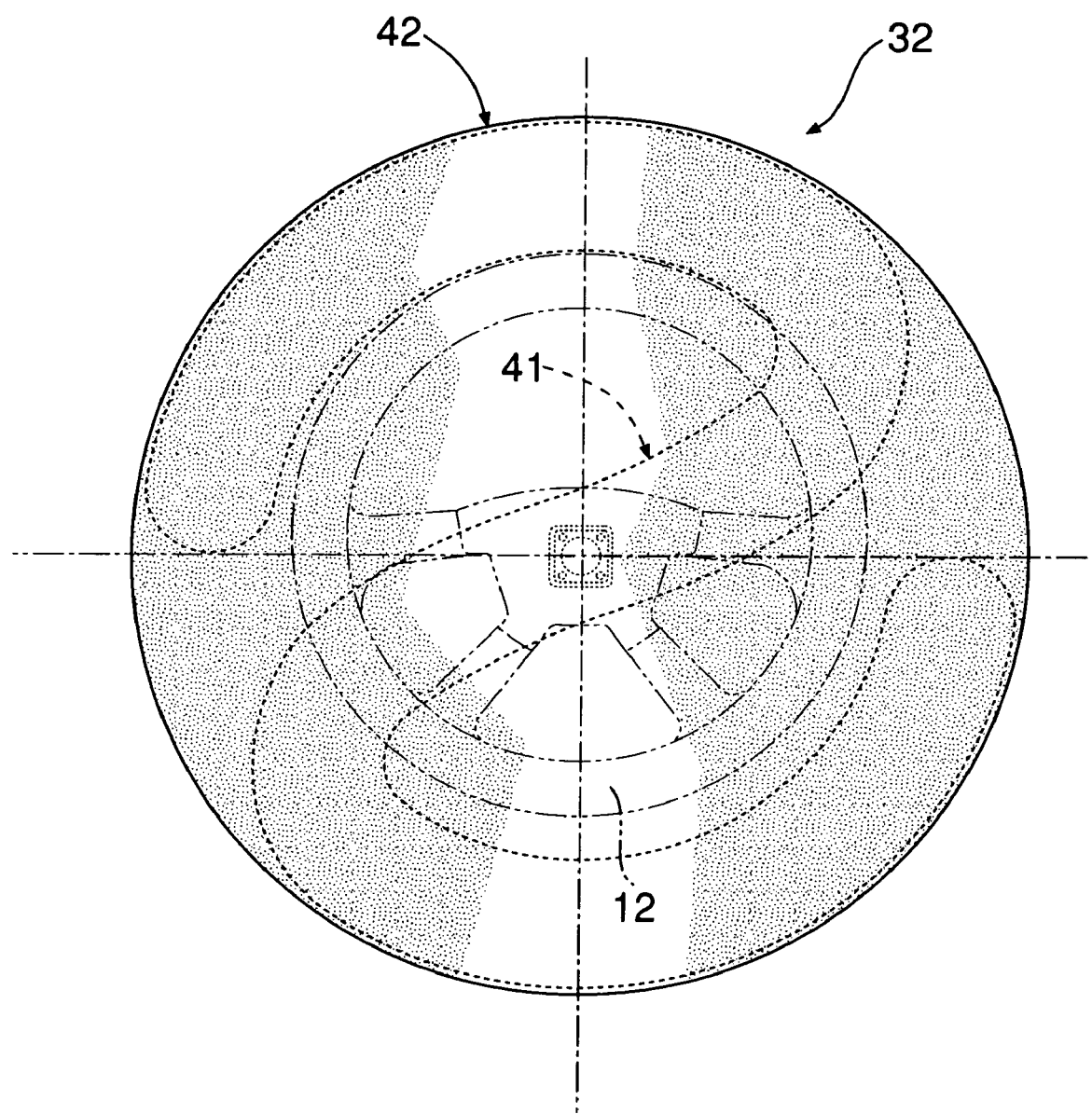
FIG. 4 is a front view of an airbag in a deployed state.
Figure 6A:
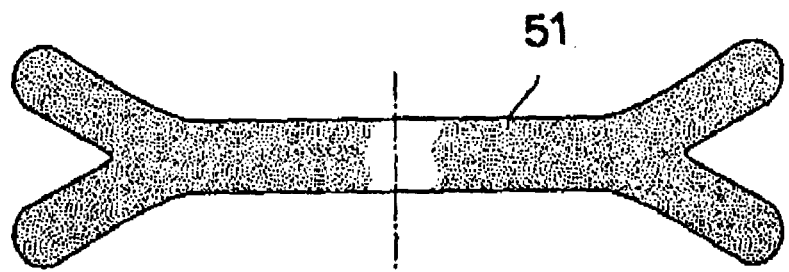
FIGS. 6A–6D are views showing other embodiments of the shape of an inner airbag.
Figure 6B:
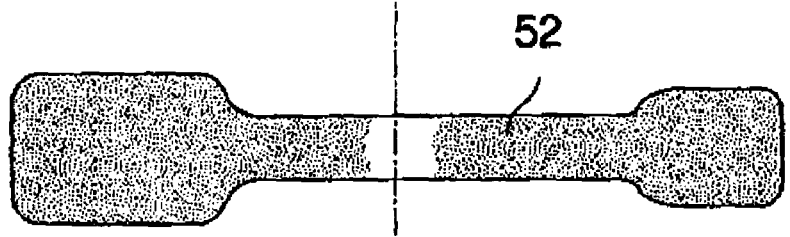
Figure 6C:
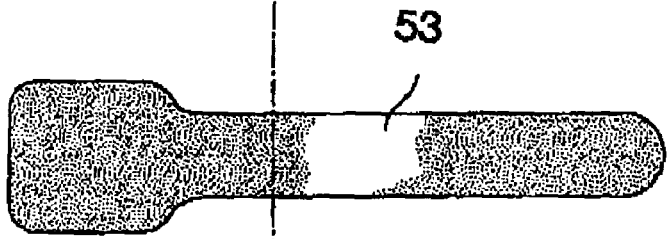
Figure 6D:
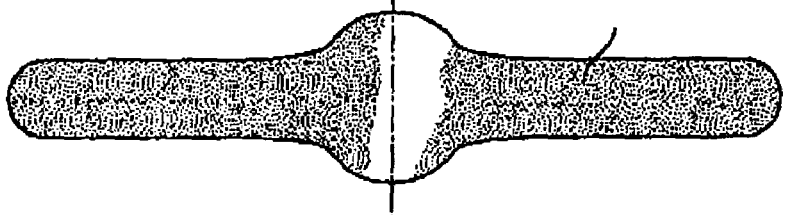

As shown in FIG. 4 and FIG. 5, the gas generated by the inflator 31 is supplied only to the inner airbag 41, and the inner airbag 41 is curved into the S-shape so as to be along the inner peripheral surface of the circular outer airbag 42 in the process of inflation. The outer airbag 42 inflates in such a manner that it is pressed by the inner airbag 41 to expand, while the outer peripheral portion of the outer airbag 42 is in direct contact with the inner airbag 41, but a part of the outer airbag 42 in the vicinity of the central portion is not in contact with the inner airbag 41. Therefore, film pressure necessary for restraining the occupant is ensured at the area in the vicinity of the central portion. In this situation, the volume of the outer airbag 42 becomes larger than the volume of the inner airbag 41.

As described above, by inflating the inner airbag 41 of a small volume, the outer airbag 42 of a volume larger than that of the inner airbag 41 can be inflated, and therefore the airbag 32 can be quickly deployed while the inflator 31 is made compact. In addition, the inner airbag 41 and the outer airbag 42 are completely independent from each other and are not sewn to each other, that is, the inner airbag 41 supplied with the gas does not share the base cloth with the outer airbag 42, and therefore it is easy to sew the inner airbag 41 and the outer airbag 42, thereby reducing the manufacturing cost. Further, since the inner airbag 41 is inflated into the S-shape so as to be along the inner peripheral surface of the outer airbag 42, the entire airbag 32 is deployed into a suitable shape by giving a sufficient tension also to the outer airbag 42 having a portion which is not in contact with the inner airbag 41, and the airbag device is allowed to exhibit sufficient occupant restraining performance.

The embodiment of the present invention has been described above, but various changes in design may be made to the present invention without departing from the subject matter of the present invention.

For example, the inner airbag 41 of the first embodiment is in the straight cylindrical shape with a circular section when the inner airbag 41 inflates in the free state without hindrance, but its shape can be properly changed in accordance with the required occupant restraining performance as in other embodiments shown in FIG. 6A to FIG. 6D. In this case, the shape of the inner airbags 51–54 may be bilaterally asymmetrical, and the outer airbag 42 is Dot required to be circular.

In the first embodiment, the airbag device for the driver's seat housed in the inside of the steering wheel 11 is shown as an example, but the present invention is applicable to an airbag device for any other purposes, such as an airbag device for a passenger's seat, which inflates from a dashboard.

Although an embodiment of the present invention has been described above, the present invention is not limited to the above-mentioned embodiment and can be modified in a variety of ways without departing from the subject matter of the present invention described in the claims.

I claim:

1. An airbag device for deploying an airbag into a vehicle compartment by inflating the airbag with a gas generated by an inflator at a time of collision of a vehicle comprising:
   an inner airbag having a first opening, and
   an outer airbag independent from the inner airbag, said outer airbag having a second opening such that said inner and outer airbags are held together so that said first and second openings are superimposed on one another, wherein the inner airbag is inflated by supplying the gas through the first opening and inflation of the inner airbag inflates the outer airbag to have a volume larger than that of the inner airbag, and wherein the first opening is approximately centered relative to ends of said inner airbag so that when inflated, the inner airbag inflates into an S-shape so as to be along an inner periphery of the outer airbag.

2. The airbag device according to claim 1, wherein said inner airbag is formed from first and second base cloths sewn together along perimeters of said first and second base cloths, respectively.

3. The airbag device according to claim 1, wherein said outer airbag is formed from third and fourth base cloths sewn together along perimeters of said third and fourth base cloths, respectively.

4. An airbag device for deploying an airbag into a vehicle compartment by inflating the airbag with a gas generated by an inflator at a time of collision of a vehicle comprising:
   an inner airbag having a first opening, and
   an outer airbag independent from the inner airbag, said outer airbag having a second opening such that said inner and outer airbags are held together so that said first and second openings are superimposed on one another, wherein the inner airbag is inflated by supplying the gas through the first opening and inflation of the inner airbag inflates the outer airbag to have a volume larger than that of the inner airbag, wherein said inner airbag is formed from first and second base cloths sewn together along perimeters of said first and second base cloths, respectively, and wherein said inner airbag is asymmetrical relative to said first opening.

5. An airbag device for deploying an airbag into a vehicle compartment by inflating the airbag with a gas generated by an inflator at a time of collision of a vehicle, comprising:
   an inner airbag formed from first and second base cloths sewn together along perimeters of said first and second base cloths, respectively, said first base cloth being located at a rear side relative to an occupant in the vehicle and said second base cloth being located at a front side;
   an outer airbag independent from the inner airbag, said outer airbag formed from third and fourth base cloths sewn together along perimeters of said third and fourth base cloths, respectively, said third base cloth located at a rear side and said fourth base cloth located at a front side:
   wherein when the inner airbag is inflated, the outer airbag is inflated to have a volume larger than that of the inner airbag; and
   wherein when the inner airbag is inflated, the inner airbag is inflated in an S-shape so as to be along an inner periphery of the outer airbag and the first base cloth of the inner airbag is placed in contact with the third base cloth of the outer airbag.

* * * * *